(12) United States Patent
Kohno

(10) Patent No.: US 7,583,666 B2
(45) Date of Patent: Sep. 1, 2009

(54) PROTOCOL INFORMATION PROCESSING SYSTEM AND METHOD INFORMATION PROCESSING DEVICE AND METHOD RECORDING MEDIUM AND PROGRAM

(75) Inventor: Michinari Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 10/515,290

(22) PCT Filed: May 19, 2003

(86) PCT No.: PCT/JP03/06181

§ 371 (c)(1),
(2), (4) Date: Nov. 19, 2004

(87) PCT Pub. No.: WO03/098884

PCT Pub. Date: Nov. 27, 2003

(65) Prior Publication Data

US 2005/0182850 A1 Aug. 18, 2005

(30) Foreign Application Priority Data

May 22, 2002 (JP) ............................ 2002-147224

(51) Int. Cl.
*H04L 12/28* (2006.01)
(52) U.S. Cl. .................. 370/389; 709/203; 714/748; 714/751
(58) Field of Classification Search ............... None
See application file for complete search history.

(56) References Cited

U.S. PATENT DOCUMENTS 5,526,399 A * 6/1996 Kameda .................... 455/74.1

(Continued)

FOREIGN PATENT DOCUMENTS

JP 9-247132 9/1997

(Continued)

OTHER PUBLICATIONS

Schulzrinne, et al.; "RPT: A Transport Protocol for Real-Time Applications"; Network Working Group Request for Comments: 1889; Standards Track; pp. 1-75; Jan. 1996.

(Continued)

*Primary Examiner*—Chirag G Shah
*Assistant Examiner*—Otis L Thompson, Jr.
(74) *Attorney, Agent, or Firm*—Finnegan, Henderson, Farabow, Garrett & Dunner, L.L.P.

(57) ABSTRACT

This invention relates to a protocol, an information processing system, an information processing method for use with the system, information processing apparatuses, information processing methods for use with the apparatuses, storage media, and programs for allowing two-way network status to be known. An RTCP packet analysis unit 66 analyzes an RTCP packet in a receiver report RR received through an RTCP port 65 from a user terminal over a network. Based on an RTCP sequence number obtained from the analyzed RTCP packet, a packet loss detection unit 67 calculates a packet loss rate with respect to the user terminal on the network. An RTCP packet creation unit 69 attaches the calculated packet loss rate to a sender report SR and transmits the sender report at predetermined time intervals to the user terminal over the network. This invention applies to system that offer streaming content transmissions and real-time data deliveries over the network.

11 Claims, 15 Drawing Sheets

U.S. PATENT DOCUMENTS

| | | | |
|---|---|---|---|
| 5,768,527 A * | 6/1998 | Zhu et al. | 709/231 |
| 6,115,390 A * | 9/2000 | Chuah | 370/443 |
| 6,148,005 A * | 11/2000 | Paul et al. | 370/469 |
| 6,278,716 B1 * | 8/2001 | Rubenstein et al. | 370/432 |
| 6,304,574 B1 * | 10/2001 | Schoo et al. | 370/401 |
| 6,501,763 B1 * | 12/2002 | Bhagavath et al. | 370/432 |
| 6,574,213 B1 * | 6/2003 | Anandakumar et al. | 370/349 |
| 6,643,496 B1 * | 11/2003 | Shimoyama et al. | 455/69 |
| 6,757,256 B1 * | 6/2004 | Anandakumar et al. | 370/252 |
| 2002/0004841 A1 | 1/2002 | Sawatari | |
| 2002/0136162 A1 * | 9/2002 | Yoshimura et al. | 370/229 |
| 2003/0126238 A1 * | 7/2003 | Kohno et al. | 709/220 |

FOREIGN PATENT DOCUMENTS

| | | |
|---|---|---|
| JP | 09-247132 | 9/1997 |
| JP | 11-177623 | 7/1999 |
| JP | 2001-320440 | 11/2001 |
| JP | 2002-135302 | 5/2002 |
| JP | 2002-141964 | 5/2002 |

OTHER PUBLICATIONS

H. Schulzrinne et al, "RFC1889: A Transport Protcol for Real-Time Applications", Jan. 1996.

* cited by examiner

F I G. 7
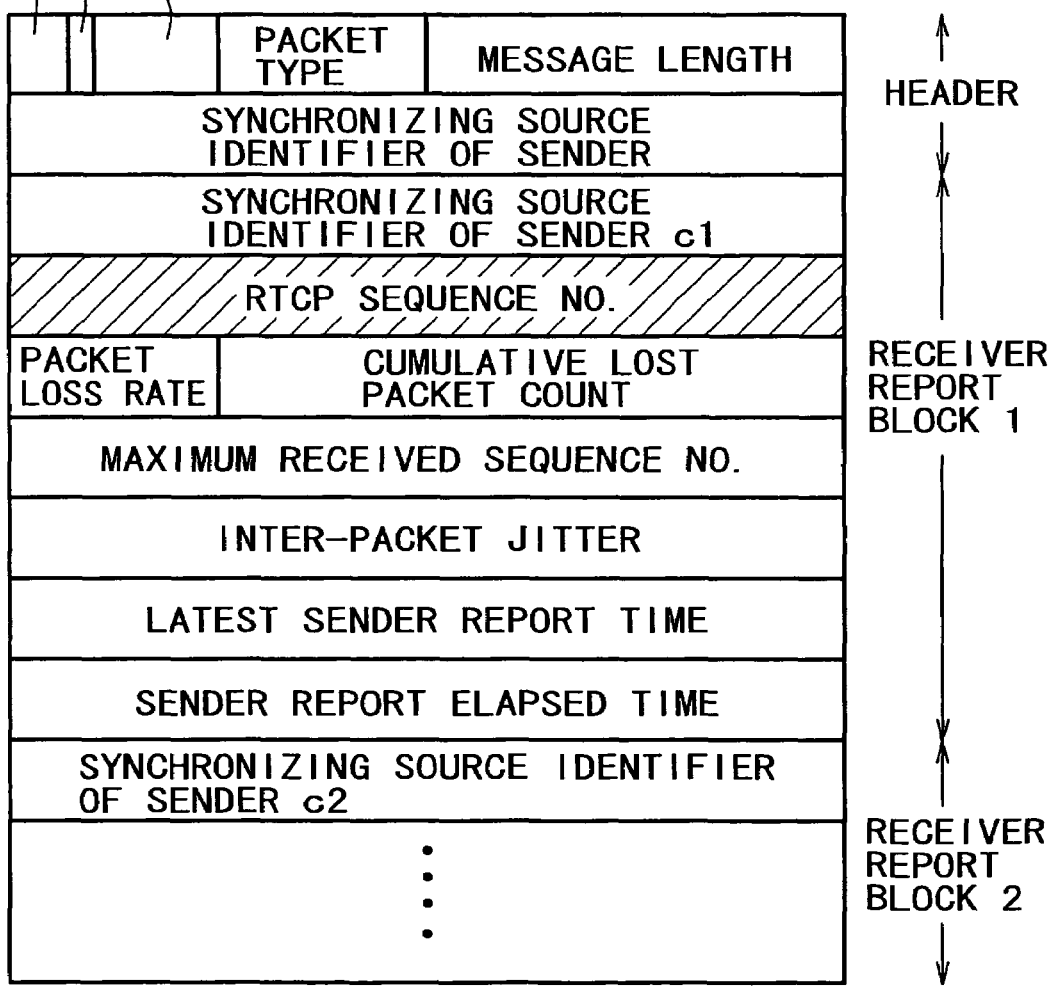

F I G. 8

| HEADER | FORMAT TYPE | PACKET TYPE | PACKET LENGTH |
|---|---|---|---|
| SYNCHRONIZING SOURCE IDENTIFIER OF SENDER ||||
| RTCP SEQUENCE NO. ||||
| TIME STAMP ||||
| REPEAT-DESIGNATED PACKET COUNT || REPEAT-DESIGNATED SEQUENCE NO. ||
| ⋮ || ⋮ ||
| REPEAT-DESIGNATED SEQUENCE NO. || REPEAT-DESIGNATED SEQUENCE NO. ||

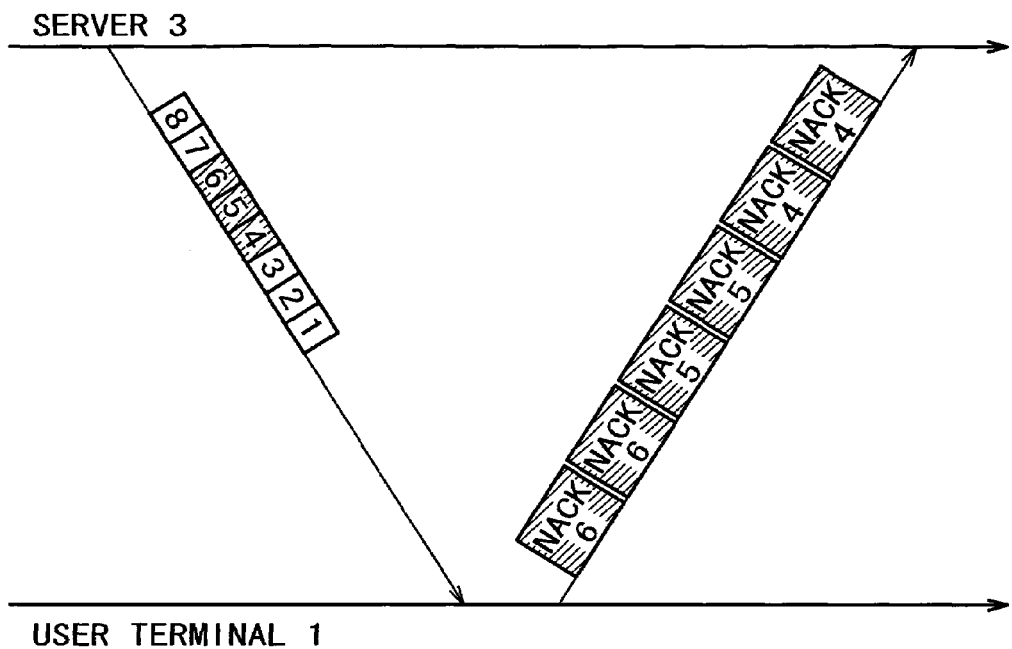
F I G. 1 5
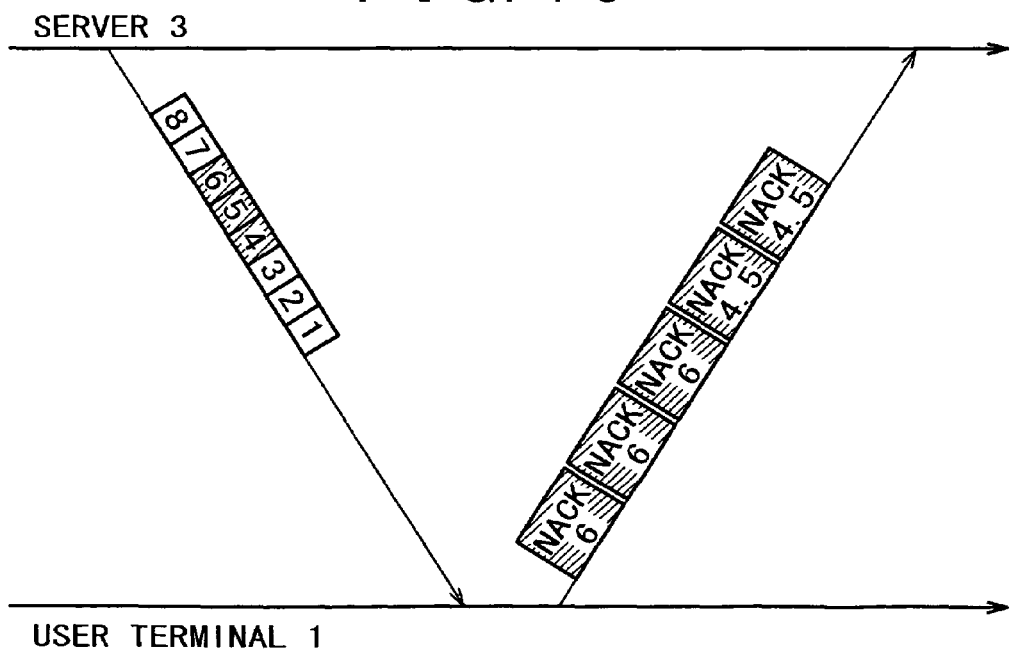
F I G. 1 6

PROTOCOL INFORMATION PROCESSING SYSTEM AND METHOD INFORMATION PROCESSING DEVICE AND METHOD RECORDING MEDIUM AND PROGRAM

TECHNICAL FIELD

The present invention relates to a protocol, an information processing system, an information processing method for use with the system, information processing apparatuses, information processing methods for use with the apparatuses, storage media, and programs. More particularly, the invention relates to a protocol, an information processing system, an information processing method for use with the system, information processing apparatuses, information processing methods for use with the apparatuses, storage media, and programs for allowing two-way network status to be grasped.

BACKGROUND ART

Data transmission services practiced in recent years on the Internet are constituted not only by services of the conventional download transmission type but also by more and more services of the so-called streaming transmission type. Under the download transmission scheme, video or audio data is downloaded from a sender server to a receiver terminal before the data is reproduced by the latter. Because the download transmission scheme allows the data to be reproduced only after it has been fully downloaded, the scheme is not suited for long-hour or real-time reproduction of video data.

Under the streaming transmission scheme, by contrast, already-received data is reproduced by the receiver terminal even as more data is being transferred to it from the sender server. Its features enable the scheme to be adapted to such applications as Internet phone calls, teleconferences, and on-demand video delivery over the Internet.

One Internet technology applicable to the streaming transmission service is RTP (Real-time Transport Protocol) stipulated by IETF (Internet Engineering Task Force) RFC (Request for Comments) 1889.

FIG. 1 is a schematic view showing a typical structure of an RTP header of an RTP packet. As illustrated, the example in FIG. 1 includes: a version number that indicates the version of RTP, padding made up of bits for adjusting the packet size, extension bits that may be designated for function extensions, a counter that indicates the number of senders involved in real-time transfer, a marker bit that indicates a data boundary, a payload type that indicates the encoding type, a sequence number that indicates the sequence of this RTC packet, a time stamp that indicates the time at which the RTP packet was transmitted, a synchronizing source identifier that identifies the initial sender of the message, and a contributing source identifier that identifies the sender having prepared a group of packets included in the message.

Attaching the time stamp to each packet enables the sender and the receiver to grasp their temporal relations during RTP-based data transfer. This helps minimize transmission irregularities of packets such as delay fluctuations (jitters), so that packetized data may be reproduced in suitably synchronized fashion.

RTP does not guarantee real-time data transfer nor does not establish or manage the priorities of packets being delivered. For these reasons, RTP packets may be subject to delivery delays or packet losses just like other types of packets. However, these are minor problems for RTP packets even if they do occur. Limited losses of video or audio data still leave the data reproduced more or less satisfactorily; the receiver terminal can proceed with reproduction using only the packets received during a predetermined time period.

Delayed packets or error-carrying packets are discarded by the receiver terminal. That means high-quality data delivered by the sender server may not be reproduced with sufficiently high quality by the receiver terminal. Particularly, if there are at least $10^{-5}$ errors in a wired transmission segment or at least $10^{-3}$ errors in a wireless transmission segment, reliability remains unacceptably low as long as RTP is applied unmodified.

The problem above has been bypassed by resorting to a technique called ARQ (Automatic Repeat Request). This is an error correcting method that involves detecting lost packets based on RTP packet sequence numbers in order to implement high-quality data transfer. ARQ applicable to the sender server is executed on the basis of RTCP, RTP, TCP, or other equivalent protocol.

As mentioned above, RTP is a protocol for transferring data in real time and has no provisions for reporting or controlling communication status. If used alone, RTP has no arrangements for controlling congestion in keeping with network status or for transferring data by taking into account the performance level of a receiver terminal. Thus RTP is employed in combination with RTCP (Real Time Control Protocol) for exchanging RTP-based information.

Under RTCP, a receiver report (RR) is sent from the receiver terminal to the sender server at predetermined time intervals and so is a sender report (SR) from the sender server to the receiver terminal. These reports allow the sender server and the receiver terminal to conduct a dynamic data transfer reflecting network status or in keeping with the status of the receiver terminal. That is, RTCP is always paired with RTP to supplement the latter functionally.

FIG. 2 is a schematic view depicting a typical structure of a receiver report under RTCP. This report constitutes information that is sent periodically from the receiver terminal to the sender server. The RTCP receiver report is further multicast by the receiver terminal. As shown in FIG. 2, the receiver report includes a header and at least one receiver report block (the example in FIG. 2 has a receiver report block 1, a receiver report block 2, etc.).

The header is made up of version information that indicates the version of RTCP, padding composed of bits for adjusting the packet size, a counter that indicates the number of senders involved in real-time transfer, a packet type, a message length, and a synchronizing source identifier of the sender (i.e., the receiver terminal transmitting this receiver report).

A receiver report block 1 constitutes information created by the receiver terminal based on a packet received from a sender a1 (i.e., sender server a1). The block 1 includes a synchronizing source identifier that identifies the sender a1 (sender server a1) having sent the packet; as well as a packet loss rate, a cumulative lost packet count, a maximum received sequence number, an inter-packet jitter, a latest sender report time, and a sender report elapsed time during transfer from the sender server a1 to the receiver terminal.

Similarly, a receiver report block 2 is constituted by a synchronizing source identifier that identifies a sender a2 (sender server a2) having sent the packet; as well as a packet loss rate, a cumulative lost packet count, a maximum received sequence number, an inter-packet jitter, a latest sender report time, and a sender report elapsed time during transfer from the sender server a2 to the receiver terminal.

There are as many receiver report blocks attached to the receiver report as the number of packets (i.e., value on the header counter) received from each sender (each sender server) from the time the receiver terminal sent the preceding receiver report until this receiver report is transmitted.

FIG. 3 is a schematic view illustrating a typical structure of a sender report under RTCP. This report constitutes information that is sent periodically from the sender server to the receiver terminal. The RTCP sender report is also multicast by the sender server. As shown in FIG. 3, the sender report includes a header, transmission information about transmitted data, and at least one receiver report block (the example in FIG. 3 has a receiver report block 1, a receiver report block 2, etc.).

As with the receiver report in FIG. 2, the header of the sender report is made up of version information, padding, a counter, a packet type, a message length, and a synchronizing source identifier of the sender (i.e., the sender server sending this sender report).

The transmission information is made up of an NTP (Network Time Protocol) time stamp that indicates the time at which this sender report was transmitted, an RTP time stamp corresponding to the NTP time stamp, and the number of packets and that of bytes transmitted from the time the sender server sent the preceding sender report until this sender report is transmitted. The NTP and RTP time stamps allow a plurality of packets to synchronize with a common time base (NTP time base in this case).

The receiver report block 1 constitutes information in the receiver report received from a sender b1 (receiver terminal b1). As such, the block 1 includes a synchronizing source identifier that identifies the sender b1 (receiver terminal b1) having sent the receiver report; as well as a packet loss rate, a cumulative lost packet count, a maximum received sequence number, an inter-packet jitter, a latest sender report time, and a sender report elapsed time during transfer from the sender server to the receiver terminal b1.

Likewise, a receiver report block 2 is constituted by a synchronizing source identifier that identifies a sender b2 (receiver terminal b2) having sent the receiver report; as well as a packet loss rate, a cumulative lost packet count, a maximum received sequence number, an inter-packet jitter, a latest sender report time, and a sender report elapsed time during transfer from the sender server to the receiver terminal b2.

There are as many receiver report blocks attached to the sender report as the number of receiver reports (i.e., value on the header counter) received from the receiver terminal from the time the sender server sent the preceding sender report until this sender report is transmitted.

The exchanges of sender and receiver reports described above permit the sender server to grasp the network status during transfer from the server to the receiver terminal. Knowing the network status allows the sender server to take QoS (Quality of Service) measures such as suitably controlling the rate of data being transferred or multiplexing packets when they are transmitted, as well as to take countermeasures against errors.

However, as discussed above, the packet loss rate and cumulative lost packet count contained in the receiver and sender reports constitute data applicable only to the transfer from the sender server to the receiver terminal; the data helps grasp what is taking place over the network during data transfer in the downward direction from the sender server to the receiver terminal, but not vice versa.

Whereas the repeat request (i.e., the above-mentioned ARQ) is executed depending on the network status during transfer in the upward direction from the receiver terminal to the sender server, the repeat request is often difficult to carry out efficiently. That is primarily due to the conventional inability to know the network status in the upward transfer direction.

One conceivable solution to the problem above involves setting up a second network constituting a feedback system in the upward direction from the receiver terminal to the sender server, independently of the network for transfer in the downward direction from the sender server to the receiver terminal, the second network being used to determine the upward-direction network status. This setup, however, entails considerable discrepancies in network status between the two networks, requiring a complicated network status reporting system for addressing both upward and downward data transfer activities.

DISCLOSURE OF INVENTION

The present invention has been made in view of the above circumstances and provides inventive arrangements for knowing two-way network status.

In carrying out the invention and according to a first aspect thereof, there is provided a protocol including a provision requiring a sequence number to be attached to each of RTCP packets.

According to a second aspect of the invention, there is provided an information processing system including a first and a second information processing apparatus; wherein the first information processing apparatus is allowed to receive a receiver report from the second information processing apparatus, acquire a sequence number from the receiver report, calculate a loss rate of packets based on the acquired sequence number, control error correction based on the calculated packet loss rate, attach the packet loss rate to a sender report, and transmit the sender report to the second information processing apparatus; and wherein the second information processing apparatus is allowed to receive data from the first information processing apparatus, acquire information about lost packets from the data, and control repeat request of the lost packets from the first information processing apparatus in keeping with the packet loss rate in the sender report coming from the first information processing apparatus.

According to a third aspect of the invention, there is provided an information processing method for use with an information processing system including a first and a second information processing apparatus, the method including the steps of: allowing the first information processing apparatus to receive a receiver report from the second information processing apparatus, acquire a sequence number from the receiver report, calculate a loss rate of packets based on the acquired sequence number, control error correction based on the calculated packet loss rate, attach the packet loss rate to a sender report, and transmit the sender report to the second information processing apparatus; and allowing the second information processing apparatus to receive data from the first information processing apparatus, acquire information about lost packets from the data, and control repeat request of the lost packets from the first information processing apparatus in keeping with the packet loss rate in the sender report coming from the first information processing apparatus.

According to a fourth aspect of the invention, there is provided a first information processing apparatus including: an acquiring element for acquiring a sequence number from a receiver report transmitted from another information processing apparatus; a calculating element for calculating a loss rate of packets based on the sequence number acquired by the acquiring element; and a transmitting element for transmitting a sender report to the other information processing apparatus after attaching to the sender report the packet loss rate calculated by the calculating element.

Preferably, the protocol for packetized data transmission applicable to the first information processing apparatus may be a combination of RTP and RTCP.

Preferably the first information processing apparatus may further include a controlling element for controlling a method for correcting any transmission errors in the data in keeping with the packet loss rate calculated by the calculating element.

Preferably, the controlling element may further include: a first determining element for determining whether the packet loss rate calculated by the calculating element is greater than a first reference value; and a setting element for setting the method for correcting the transmission errors in the data in keeping with what is determined by the determining element.

Preferably, the controlling element may further include a second determining element which, if the first determining element determines that the packet loss rate is smaller than the first reference value, then determines whether the packet loss rate is greater than a second reference value; wherein, if the second determining element determines that the packet loss rate is smaller than the second reference value, then the setting element may inhibit the correction of the transmission errors in the data.

Preferably, if the first determining element determines that the packet loss rate is greater than the first reference value, then the setting element may set FEC as the method for correcting the transmission errors in the data; and if the first determining element determines that the packet loss rate is smaller than the first reference value and if the second determining element determines that the packet loss rate is greater than the second reference value, then the setting element may set ARQ as the method for correcting the transmission errors in the data.

According to a fifth aspect of the invention, there is provided a first information processing method for use with an information processing apparatus communicating with another information processing apparatus, the method including the steps of: acquiring a sequence number from a receiver report transmitted from the other information processing apparatus; calculating a loss rate of the packets based on the sequence number acquired in the acquiring step; and transmitting a sender report to the other information processing apparatus after attaching to the sender report the packet loss rate calculated in the calculating step.

According to a sixth aspect of the invention, there is provided a first storage medium which stores a program for controlling an information processing apparatus communicating with another information processing apparatus, the program including the steps of: acquiring a sequence number from a receiver report transmitted from the other information processing apparatus; calculating a loss rate of the packets based on the sequence number acquired in the acquiring step; and transmitting a sender report to the other information processing apparatus after attaching to the sender report the packet loss rate calculated in the calculating step.

According to a seventh aspect of the invention, there is provided a first program for controlling an information processing apparatus communicating with another information processing apparatus, the first program including the steps of: acquiring a sequence number from a receiver report transmitted from the other information processing apparatus; calculating a loss rate of the packets based on the sequence number acquired in the acquiring step; and transmitting a sender report to the other information processing apparatus after attaching to the sender report the packet loss rate calculated in the calculating step.

According to an eighth aspect of the invention, there is provided a second information processing apparatus communicating with another information processing apparatus, the second information processing apparatus including: a receiving element for receiving data from the other information processing apparatus; an acquiring element for acquiring information about lost packets from the data received by the receiving element; a controlling element for controlling repeat request of the lost packets about which the information was acquired by the acquiring element, in keeping with a loss rate of packets in a sender report coming from the other information processing apparatus; and a transmitting element for transmitting a repeat request of the lost packets to the other information processing apparatus under control of the controlling element.

Preferably, the protocol for packetized data transmission applicable to the second information processing apparatus may be a combination of RTP and RTCP.

Preferably, if ARQ is used as a method for correcting any transmission errors in the data and if the packet loss rate is greater than a reference value, then the controlling element may request the retransmission of the lost packets in a redundant manner.

According to a ninth aspect of the invention, there is provided a second information processing method for use with an information processing apparatus communicating with another information processing apparatus, the method including the steps of: receiving data from the other information processing apparatus; acquiring information about lost packets from the data received in the receiving step; controlling repeat request of the lost packets about which the information was acquired in the acquiring step, in keeping with a loss rate of packets in a sender report coming from the other information processing apparatus; and transmitting a repeat request of the lost packets to the other information processing apparatus under control of the controlling step.

According to a tenth aspect of the invention, there is provided a second storage medium which stores a program for controlling an information processing apparatus communicating with another information processing apparatus, the program including the steps of: receiving data from the other information processing apparatus; acquiring information about lost packets from the data received in the receiving step; controlling repeat request of the lost packets about which the information was acquired in the acquiring step, in keeping with a loss rate of packets in a sender report coming from the other information processing apparatus; and transmitting a repeat request of the lost packets to the other information processing apparatus under control of the controlling step.

According to an eleventh aspect of the invention, there is provided a second program for controlling an information processing apparatus communicating with another information processing apparatus, the second program including the steps of: receiving data from the other information processing apparatus; acquiring information about lost packets from the data received in the receiving step; controlling repeat request of the lost packets about which the information was acquired in the acquiring step, in keeping with a loss rate of packets in a sender report coming from the other information processing apparatus; and transmitting a repeat request of the lost packets to the other information processing apparatus under control of the controlling step.

As outlined above, the protocol according to the invention includes a provision requiring a sequence number to be attached to each of RTCP packets.

Where the information processing system and the information processing method according to the second and the third aspects of this invention are in use, the first information processing apparatus is allowed by the first information processing method to receive a receiver report from the second information processing apparatus, acquire a sequence number from the receiver report, calculate a loss rate of packets based on the acquired sequence number, control error correction based on the calculated packet loss rate, attach the packet loss rate to a sender report, and transmit the sender report to the second information processing apparatus. The second information processing apparatus is allowed by the second information processing method to receive data from the first information processing apparatus, acquire information about lost packets from the data, and control repeat request of the lost packets from the first information processing apparatus in keeping with the packet loss rate in the sender report coming from the first information processing apparatus.

Through the use of the first information processing apparatus, the first information processing method, the first storage medium, and the first program according to the fourth, the fifth, the sixth, and the seventh aspects of the invention respectively, a sequence number is first acquired from a receiver report transmitted from the other information processing apparatus. A loss rate of the packets is calculated based on the sequence number thus acquired. A sender report is then transmitted to the other information processing apparatus after the calculated packet loss rate is attached to the report.

Through the use of the second information processing apparatus, the second information processing method, the second storage medium, and the second program according to the eighth, the ninth, the tenth, and the eleventh aspects of the invention respectively, data is first received from the other information processing apparatus. Information is acquired about lost packets from the received data. Repeat request of the lost packets about which the information was acquired is controlled in keeping with a loss rate of packets in a sender report coming from the other information processing apparatus. A repeat request of the lost packets is then transmitted to the other information processing apparatus under appropriate control.

It should be understood that the expression "network" refers to a setup in which at least two apparatuses are connected so that information may be sent from one connected apparatus to another. The apparatuses communicating with one another over the network may be independent apparatuses or may be internal blocks constituting a single piece of equipment.

BRIEF DESCRIPTION OF DRAWINGS

FIG. 7 is a schematic view exhibiting a typical structure of a receiver report under RTCP sent from the user terminal in FIG. 4;

FIG. 8 is a schematic view showing a typical structure of a NACK packet sent from the user terminal in FIG. 4;

FIG. 15 is an explanatory view of other NACK packets sent from the user terminal in FIG. 4;

FIG. 16 is an explanatory view of other NACK packets sent from the user terminal in FIG. 4.

BEST MODE FOR CARRYING OUT THE INVENTION

Preferred embodiments of this invention will now be described with reference to the accompanying drawings.

Figure 4:
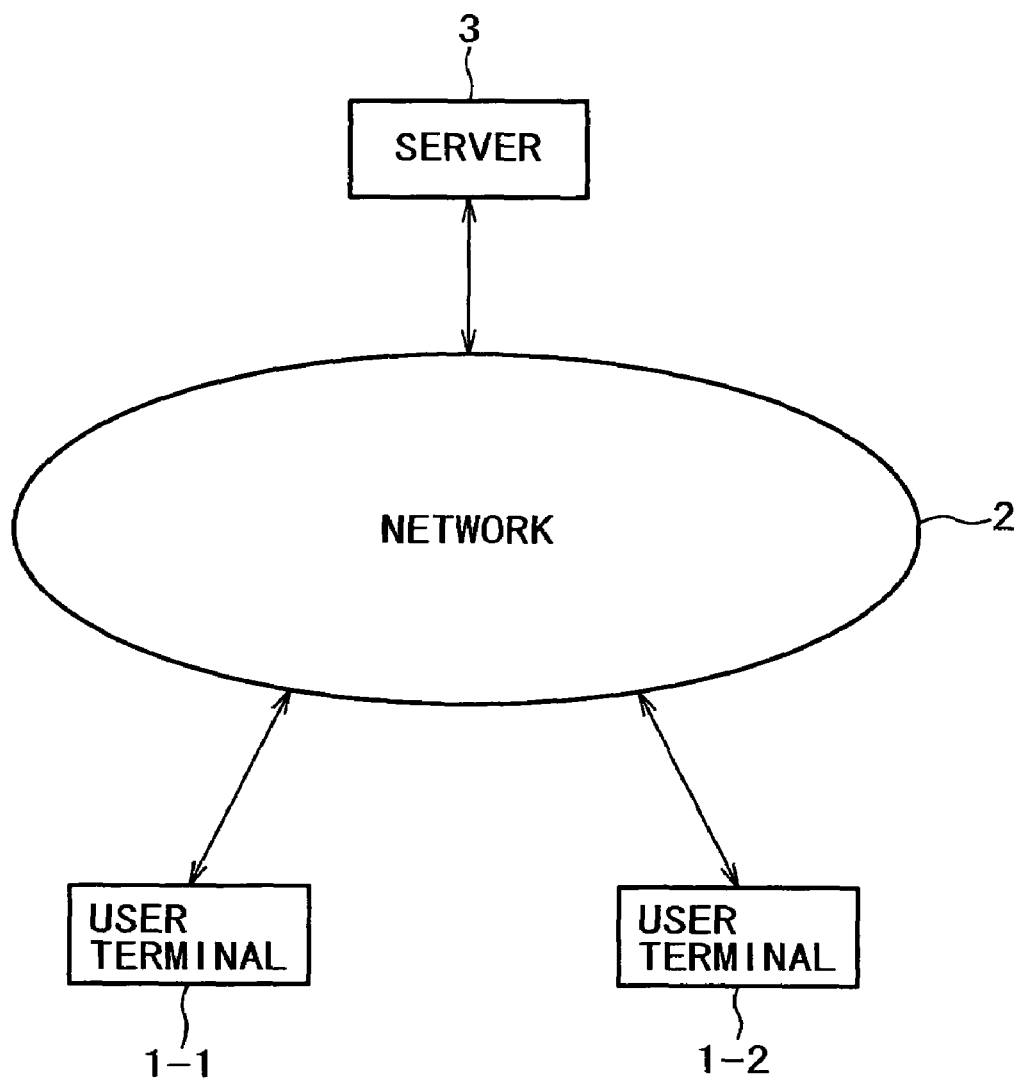
FIG. 4 is a schematic view indicating a typical structure of a stream content delivery system embodying this invention.

FIG. 4 schematically indicates a typical structure of a streaming content delivery system embodying this invention. In FIG. 4, a network 2 such as the Internet is shown connected with user terminals 1-1 and 1-2 (these user terminals will be generically referred to as the use terminal 1 hereunder if there is no specific need for distinction therebetween). Whereas only two user terminals are shown in FIG. 4, any number of user terminals may be connected to the network 2 in practice.

A server 3 offering streaming content (simply called content hereunder) to the user terminal 1 is connected to the network 2. In practice, any number of servers 3 may be connected to the network 2.

Figure 5:
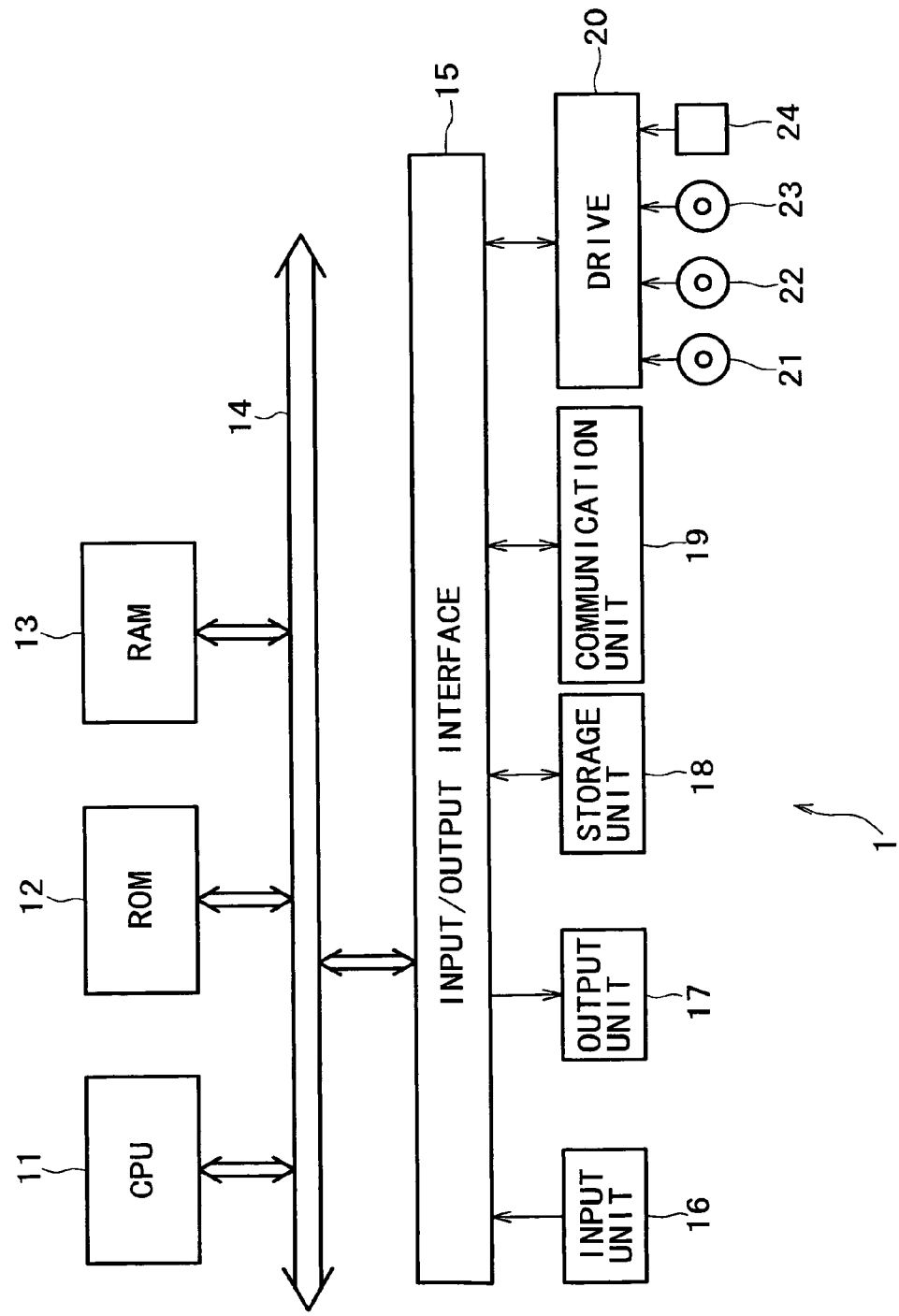
FIG. 5 is a block diagram presenting a typical structure of a user terminal included in FIG. 4.

FIG. 5 is a block diagram outlining a typical structure of the user terminal 1. As shown in FIG. 5, a CPU (central processing unit) 11 performs various processes in accordance with programs held in a ROM (read only memory) 12 or with programs loaded from a storage unit 18 into a RAM (random access memory) 13. The RAM 13 may also accommodate data necessary for the CPU 11 to execute its diverse processes.

The CPU 11, ROM 12, and RAM 13 are interconnected via a bus 14. An input/output interface 15 is also connected to the bus 14.

The input/output interface 15 is connected with an input unit 16, an output unit 17, the storage unit 18, and a communication unit 19. The input unit 16 is typically made up of a keyboard and a mouse; the output unit 17 is composed of a display device such as CRT (cathode ray tube) or LCD (liquid crystal display) and speakers; the storage unit 18 is formed by a hard disk drive; and the communication unit 19 is constituted by a modem, a terminal adapter, and/or other equipment. The communication unit 19 handles communications over the network 2.

A drive 20 is connected as needed to the input/output interface 15. A magnetic disk 21, an optical disk 22, a magneto-optical disk 23, or a semiconductor memory 24 may be loaded into the drive 20. Computer programs may be retrieved from the loaded storage medium and installed as needed into the storage unit 18.

The server 3 basically has the same structure as the user terminal 1. Thus the structure of the user terminal 1 in FIG. 5 may be cited where appropriate as representative of the server 3 in the description that follows.

Figure 6:
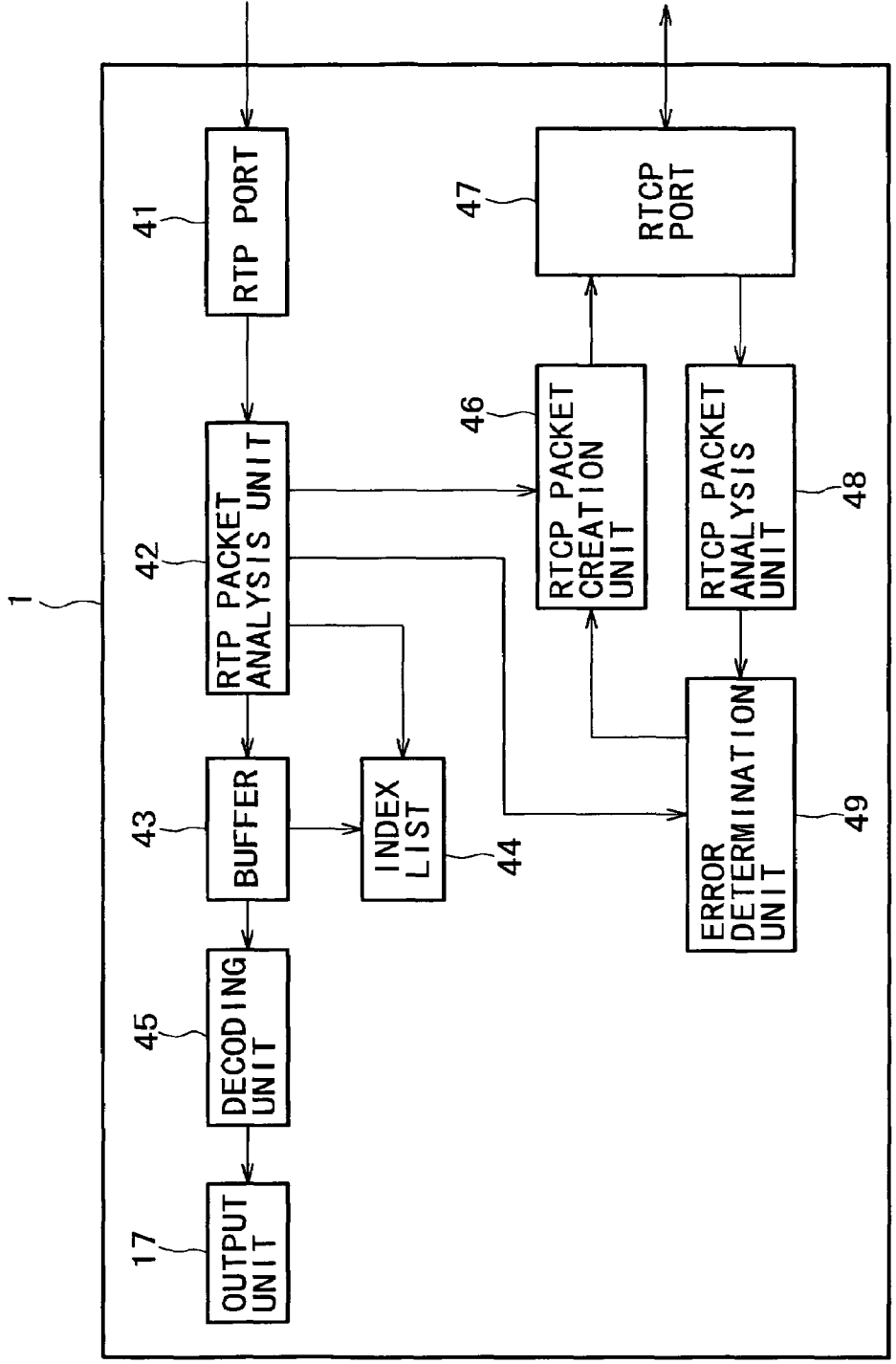
FIG. 6 is a block diagram outlining a typical functional structure of the user terminal in FIG. 4.

FIG. 6 is a block diagram showing a typical functional structure of the user terminal 1. The function blocks indicated in FIG. 6 are implemented illustratively by the CPU 11 of the user terminal 1 carrying out corresponding control programs.

An RTP port 41 of the user terminal 1 receives RTP-based packetized content data from the server 3 over the network 2. The received data is forwarded to an RTP packet analysis unit 42. The RTP packet analysis unit 42 splits each RTP packet into a header part and a data part for analysis and stores the content data from the data part into a buffer 43. The location (i.e., address) of the buffer 43 where the content data is accumulated may be written to an index list 44 together with header information described in the header.

A decoding unit 45 decodes the content data retrieved from the buffer 43 at predetermined reproduction times. The decoded content data is output to the display and/or speakers making up the output unit 17 whereby the content data is reproduced.

While content data is being received through the RTP port 41, an RTCP packet creation unit 46 creates a receiver report RR at predetermined time intervals based on the header information from the RTP packets analyzed by the RTP packet analysis unit 42. The receiver report RR thus created is output to an RTCP port 47.

Figure 2:
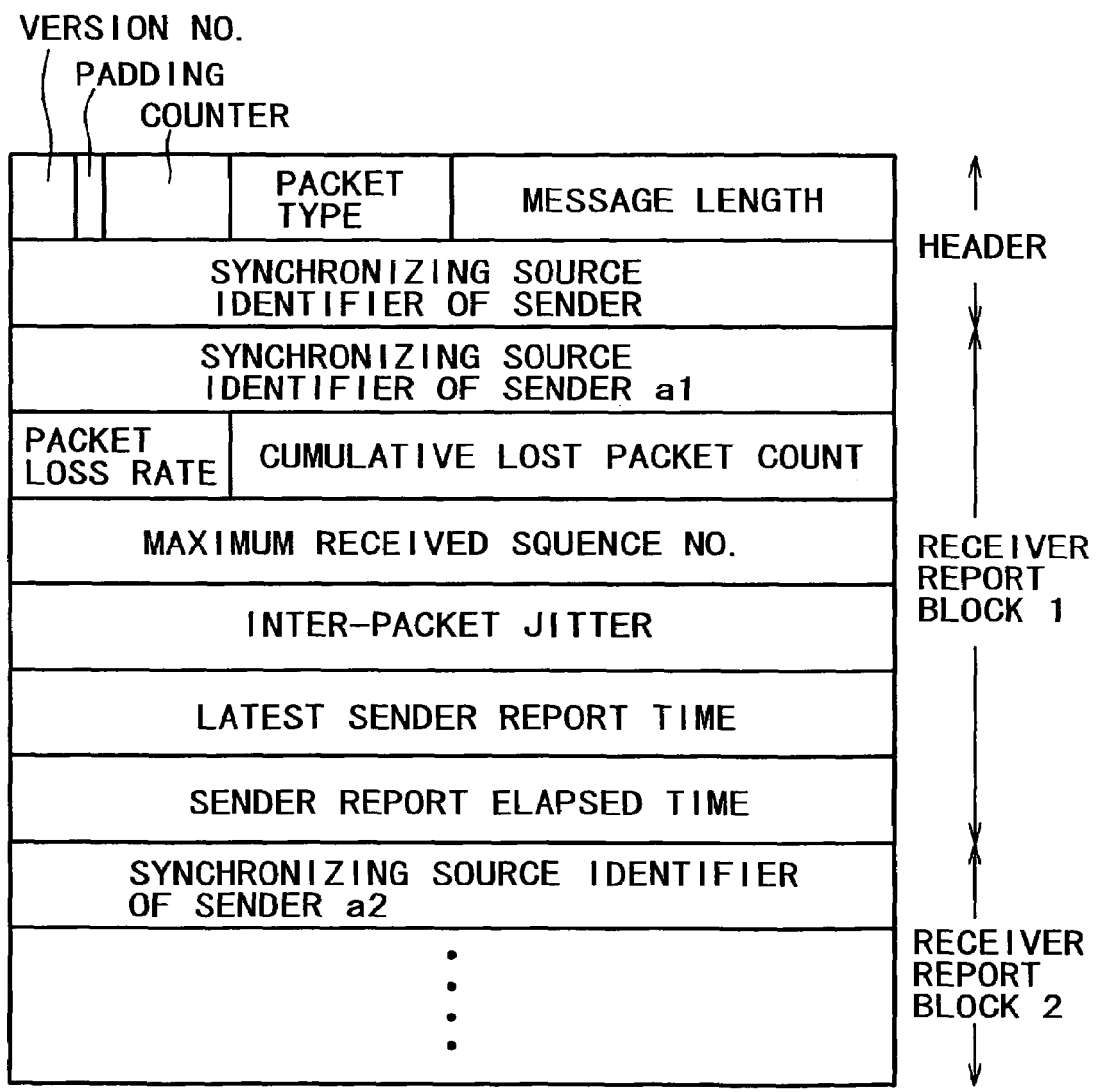
FIG. 2 is a schematic view depicting a typical structure of a receiver report under RTCP.

FIG. 7 is a schematic view showing a typical structure of the receiver report RR under RTCP sent from the user terminal 1-1 to the server 3. The receiver report RR in FIG. 7 basically has the same structure as the above-described receiver report RR in FIG. 2, except that an RTCP sequence number is added after a synchronizing source identifier identifying a sender c1 of a receiver report block 1. Thus the structure of the receiver report RR in FIG. 2 may be cited where appropriate as representative of the receiver report shown in FIG. 7.

In the receiver report RR of FIG. 7, a synchronizing source identifier identifying the sender of the header corresponds to the user terminal 1-1. The receiver report block 1 is regard as information about the packets sent from the sender c1 (server 3). A receiver report block 2 is regarded as information about the packets sent from a sender c2 (another server, not shown).

The RTP packet creation unit 46 thus creates the receiver report block 1 based on the packets transmitted from the server 3. At this point, the receiver report RR is created by adding an RTCP sequence number after the synchronizing source identifier of the sender c1 (server 3) having sent the receiver report block 1.

The RTCP port 47 transmits the receiver report RR to the server 3 over the network 2. From the server 3, the RTCP port 47 receives via the network 2 a sender report SR or EOD (end of data) message data indicating the end of a content data transmission.

An RTCP packet analysis unit 48 analyzes the received sender report SR. The sender report SR (to be described later with reference to FIG. 10) contains an RTCP sequence number of an RTCP packet and a packet loss rate in the transmission from the user terminal 1 to the server 3.

Where ARQ (Automatic Repeat Request) is adopted as the error correcting method, an error determination unit 49 detects lost packets from the content data sent from the server 3 to the user terminal 1 on the basis of the header information analyzed by the RTP packet analysis unit 42. With the lost packets thus detected, the error determination unit 49 instructs the RTCP packet creation unit 46 to issue a repeat request. When giving the instruction to the RTCP packet creation unit 46, the error determination unit 49 may change a repeat requesting method in keeping with the RTCP sequence number in the RTCP packet and with the packet loss rate in the transmission from the user terminal 1 to the server 3.

Given the instruction containing the changed repeat requesting method, the RTCP packet creation unit 46 accordingly creates a repeat request NACK (negative knowledge) packet and sends the created packet to the server 3 through the RTCP port 47.

FIG. 8 is a schematic view showing a typical structure of a repeat request NACK packet under RTCP sent from the user terminal 1-1 to the server 3. In the example of FIG. 8, the repeat request NACK packet is made up of a header, a format type, a packet type, a packet length, a synchronizing source identifier of the sender (i.e., user terminal 1-1 having sent the repeat request NACK packet), an RTCP sequence number, and a time stamp. These items basically have the same meanings as their counterparts in FIG. 7 (and those in FIG. 2). The time stamp in the packet structure is followed by a repeat-designated packet count corresponding to the lost packets detected from the header information in the RTC packet, and repeat-designated sequence numbers.

Figure 9:
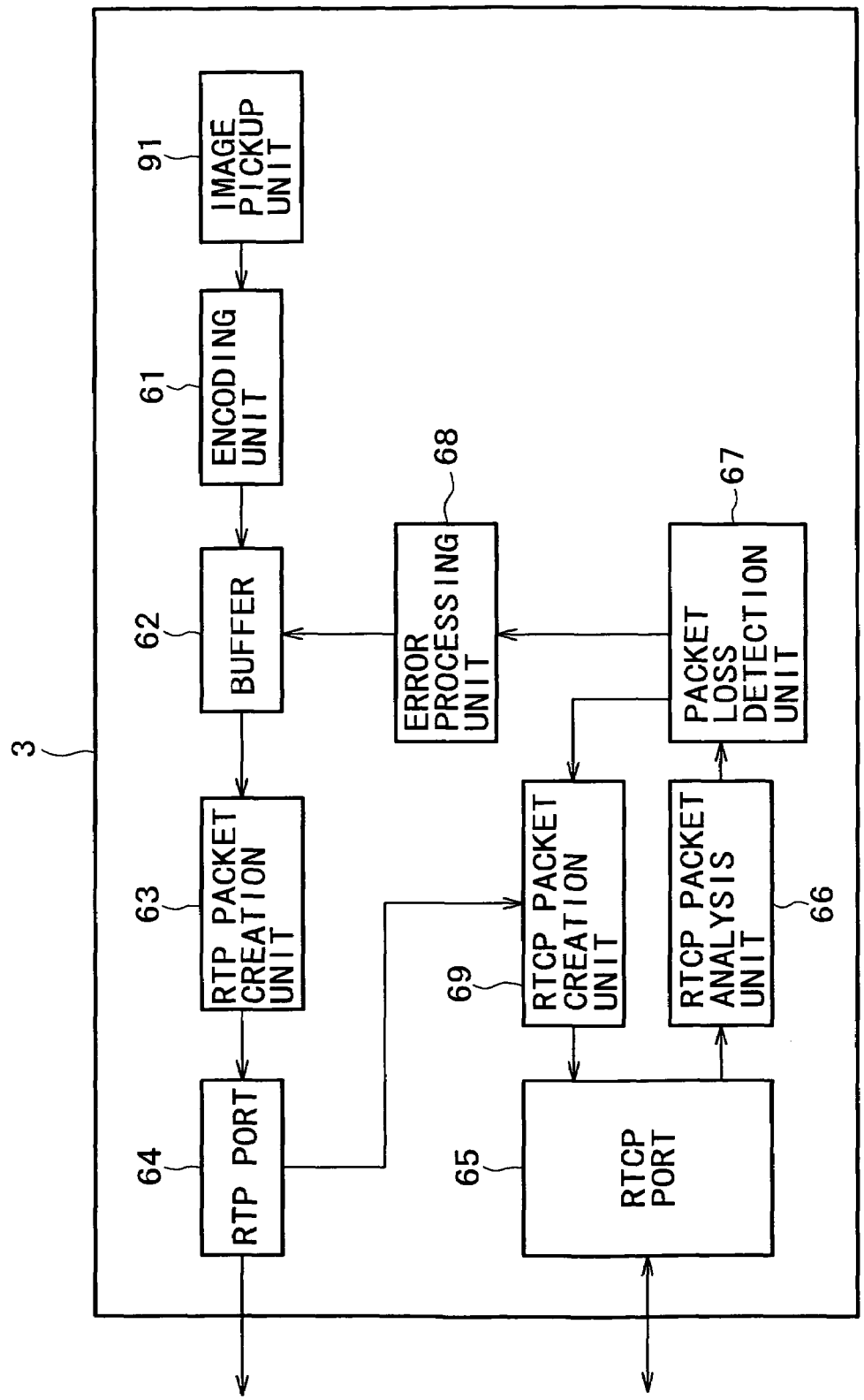
FIG. 9 is a block diagram depicting a typical functional structure of a server included in FIG. 4.

FIG. 9 is a block diagram depicting a typical functional structure of the server 3. The function blocks shown in FIG. 9 are implemented illustratively by the CPU 11 of the server 3 carrying out corresponding control programs.

As requested by the user terminal 1, an image pickup unit 91 takes pictures of a subject and outputs content data (formed by video and audio data) about the subject in real time. An encoding unit 61 encodes the content data from the image pickup unit 91 and stores the encoded data into a buffer 62.

Under RTP, an RTP packet creation unit 63 packetizes content data held in the buffer 62 and outputs the packetized data to an RTP port 64. The RTP port 64 transmits the packetized content data to the user terminal 1 over the network 2 under RTP.

An RTCP port 65 receives a packet of a repeat request NACK (FIG. 8) or a receiver report RR (FIG. 7) from the user terminal 1 over the network 2, and outputs what is received to an RTCP packet analysis unit 66. The repeat request NACK or the receiver report RR is made up of an RTCP packet supplemented with an RTCP sequence number.

The RTCP packet analysis unit 66 analyzes the RTCP packet of the repeat request NACK or of the receiver report RR. Based on the RTCP sequence number from the RTCP packet of the analyzed receiver report RR, a packet loss detection unit 67 calculates a packet loss rate applicable to data transfer from the user terminal 1 to the server 3 over the network 2. On the basis of the RTCP packet of the analyzed repeat request NACK, the packet to an error processing unit 68.

Given the packet repeat request data, the error processing unit 68 retrieves from the buffer 62 data containing the packets to be repeated, and transmits the retrieved data to the user terminal 1 via the RTP packet creation unit 63 and RTP port 64. If necessary, the error processing unit 68 may send the packets to be repeated a plurality of times.

An RTCP packet creation unit 69 attaches to a sender report SR the packet loss rate calculated by the packet loss detection unit 67, and transmits the sender report SR at predetermined time intervals to the user terminal 1 through the RTCP port 65 over the network 2. When the RTP port 64 detects an end of the content data transmission, the RTCP packet creation unit 69 sends EOD message data to the user terminal 1 through the RTCP port 65 over the network 2.

Figure 3:
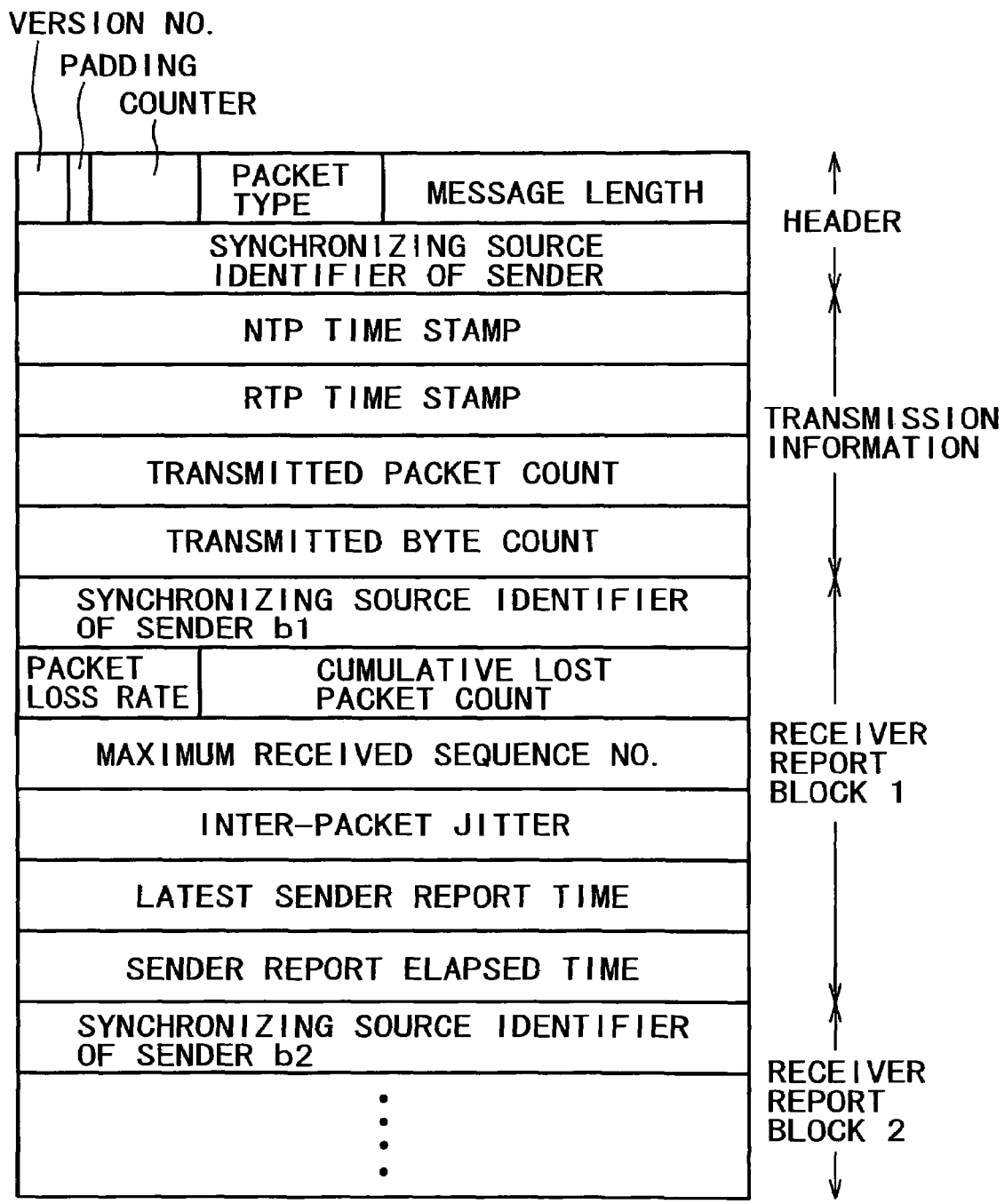
FIG. 3 is a schematic view illustrating a typical structure of a sender report under RTCP.
Figure 10:
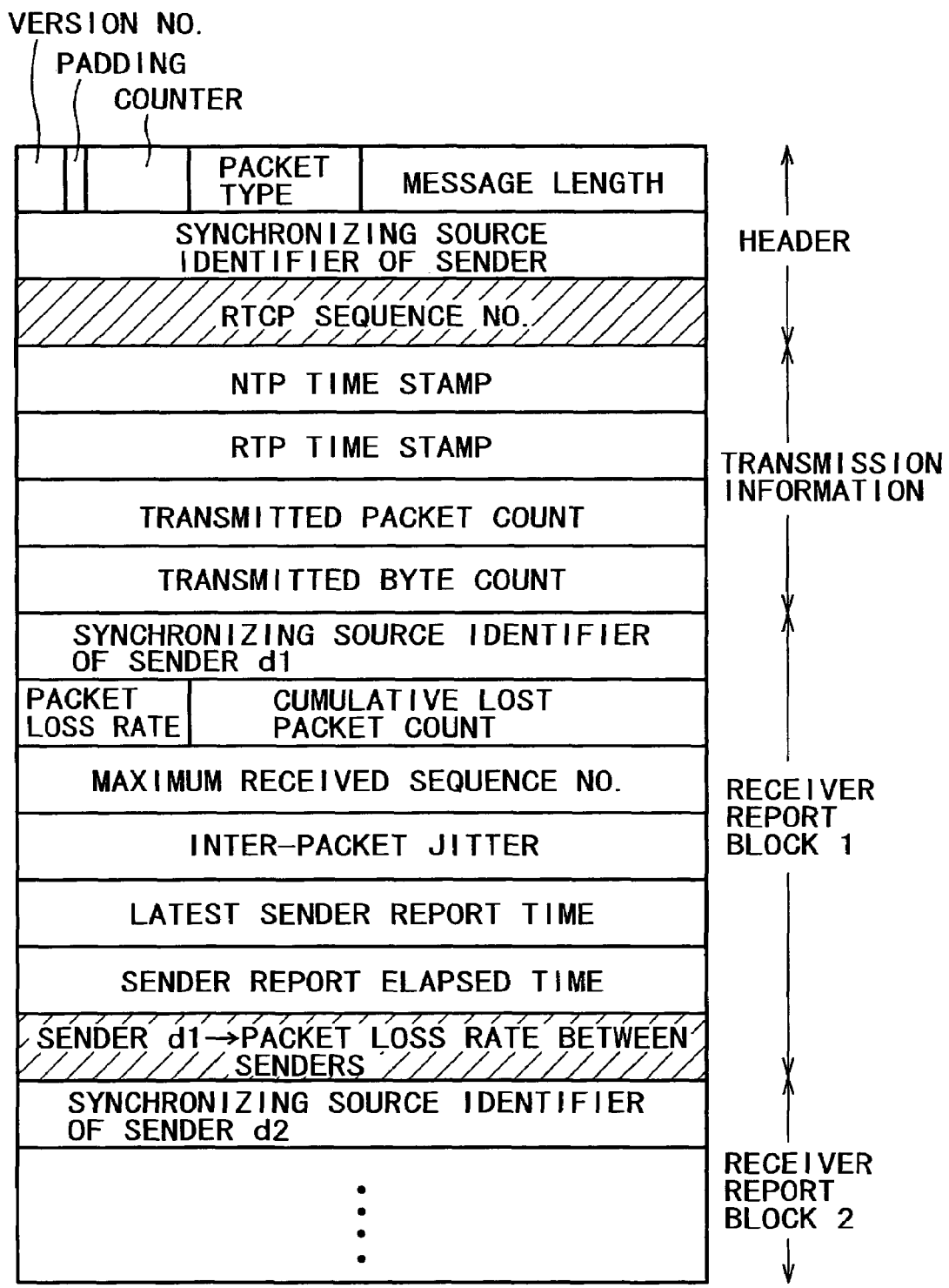
FIG. 10 is a schematic view sketching a typical structure of a sender report under RTCP sent from the server in FIG. 4.

FIG. 10 is a schematic view sketching a typical structure of a sender report SR under RTCP transmitted from the server 3. The sender report SR in FIG. 10 basically has the same structure as above-described sender report SR in FIG. 3, except that the header is added an RTCP sequence number after the synchronizing source identifier of the sender and that the receiver report block 1 is followed by the packet loss rate in the data transferred from a sender d1 to this sender (server 3). Thus the structure of the sender report SR in FIG. 3 may be cited where appropriate as representative of the sender report SR in FIG. 10 in the ensuing description.

In the example of FIG. 10, the receiver report block 1 is regarded as information illustratively corresponding to the receiver report sent from the user terminal 1-1 (sender d1), and the receiver report block 2 corresponding to the receiver report sent from the user terminal 1-2 (sender d2).

That is, what is described in the receiver report block 1 is the information based on the receiver report sent from the user terminal 1-1. The RTCP packet creation unit 69 creates the sender report SR by adding an RTCP sequence number after the synchronizing source identifier of the header sender (server 3) and by placing the packet loss rate regarding data transfer from the sender d1 (user terminal 1-1) to this sender (server 3) at the end of the receiver report block 1. Similarly, where an RTCP sequence number is found attached to the receiver report sent from the user terminal 1-2, the packet loss rate in data transfer from the sender d2 (user terminal 1-2) to the sender (server 3) is placed at the end of the receiver report block 2.

In addition to the packet loss rate, it is possible to include an error RTCP sequence number list describing the RTCP sequence numbers of the RTCP packets lost during transfer from the user terminal 1.

Figure 11:
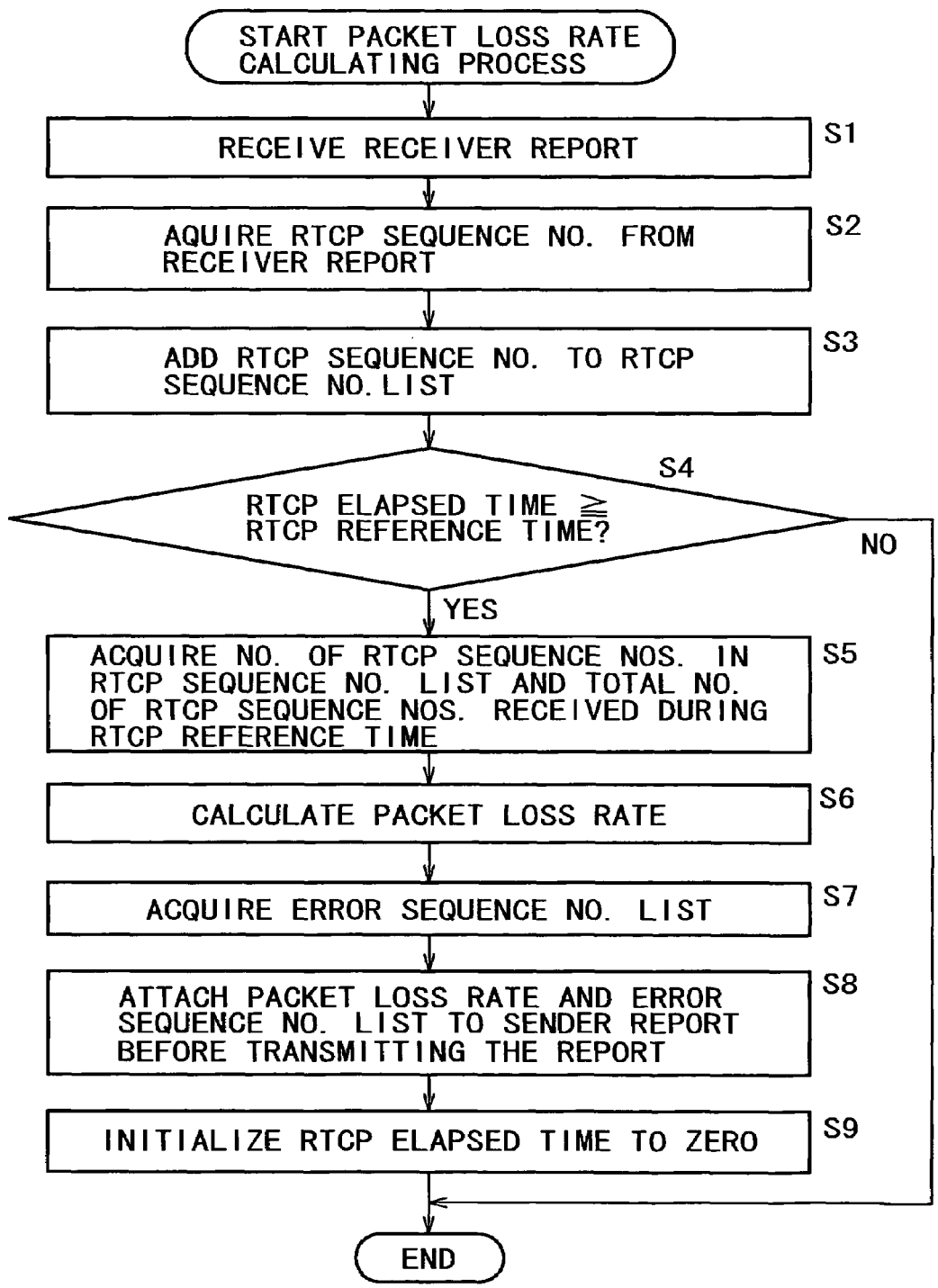
FIG. 11 is a flowchart of steps constituting a packet loss rate calculating process performed by the server in FIG. 4.

Described below with reference to the flowchart of FIG. 11 is a packet loss rate calculating process performed by the server 3. In the example of FIG. 11, the time period at intervals of which the sender report SR is sent by the server 3 is established as an RTCP reference time Ti. What needs to be acquired is the packet loss time during the RTCP reference time Ti.

While content data is being received from the server 3 through the RTP port 41, the RTCP packet creation unit 46 of the user terminal 1 creates a receiver report RR at predetermined time intervals and transmits the created receiver report RR to the server 3 through the RTCP port 47 over the network 2. In turn, the RTCP port 65 of the server 3 receives the receiver report RR in step S1 of FIG. 11.

In step S2, the RTCP packet analysis unit 66 acquires an RTCP sequence number from the receiver report RR. In step S3, the RTCP sequence number is added to an RTCP sequence number list AL. This list is held illustratively in the RAM 13 and is reset when a sender report SR is transmitted. After the reset, RTCP sequence numbers are added anew to the RTCP sequence number list AL.

Using an internal clock, the RTCP packet creation unit 69 measures an elapsed time T since the receiver report RR under RTCP was last received from the user terminal 1 (the measured time is called the RTCP elapsed time T). In step S4, the RTCP packet creation unit 69 determines whether the RTCP elapsed time T has reached the predetermined RTCP reference time Ti (transmission interval Ti of the sender report SR).

If in step S4 the RTCP elapsed time T is not found to have reached the RTCP reference time T1, steps S5 through S9 are skipped, and the process as a whole is brought to an end.

If in step S4 the RTCP elapsed time Ti is found to become equal to or greater than the RTCP reference time Ti, then step S5 is reached. In step S5, the RTCP packet creation unit 69 acquires the number AN of RTCP sequence numbers in the RTCP sequence number list AL. At the same time, the RTCP packet creation unit 69 obtains the total number BN of RTCP sequence numbers when all receiver reports RR were normally received from the user terminal 1 during the RTCP reference time Ti.

The total number BN of RTCP sequence numbers is acquired as follows: in this example, the receiver report RR is sent from the user terminal 1 at predetermined intervals of a time period Tu. If the ratio of the predetermined time period Tu to the established RTCP reference time Ti (Tu/Ti) is 1 to 100, then the total number BN of RTCP sequence numbers is regarded and 100.

In step S6, the packet loss detection unit 67 calculates a packet loss rate E based on the number AN of RTCP sequence numbers and on the total number BN of RTCP sequence numbers using the expression (1) below:

$$\text{Packet loss rate } E = AN/BN \tag{1}$$

In step S7, the packet loss detection unit 67 acquires an error RTCP sequence number list CL. The error RTCP sequence number list CL is obtained by subtracting an actually received RTCP sequence number list AL from the RTCP sequence number list when all receiver reports RR were normally received from the user terminal 1 during the RTCP reference time Ti.

In step S8, the RTCP packet creation unit 69 attaches to a sender report SR the packet loss rate E obtained in step S6 and the error RTCP sequence number list CL acquired in step S7, and transmits the sender report SR thus prepared to the user terminal 1 through the RTCP port 65 over the network 2.

In step S9, the RTCP packet creation unit 69 initializes the RTCP elapsed time T to zero. A this point, the RTCP sequence number list AL is also reset.

In the foregoing description, the RTCP elapsed time T was shown compared with the RTCP reference time Ti in step S4. Alternatively, steps S2, S3, and S5 through S9 may be carried out when the RTCP elapsed time T is found equal to the RTCP reference time Ti.

As described, adding the RTCP sequence number to the receiver report RR allows the server 3 to acquire the packet loss rate applicable to data transfer from the user terminal 1 to the server 3. It is then possible for the server 3 to grasp the status of the network 2 during data transfer from the user terminal 1 to the server 3.

The packet loss rate thus obtained with regard to data transfer from the user terminal 1 to the server 3 is further added to the sender report SR that is transmitted to the user terminal 1. This also permits the user terminal 1 to grasp the status on the network 2 during data transfer from the user terminal 1 to the server 3.

Figure 12:
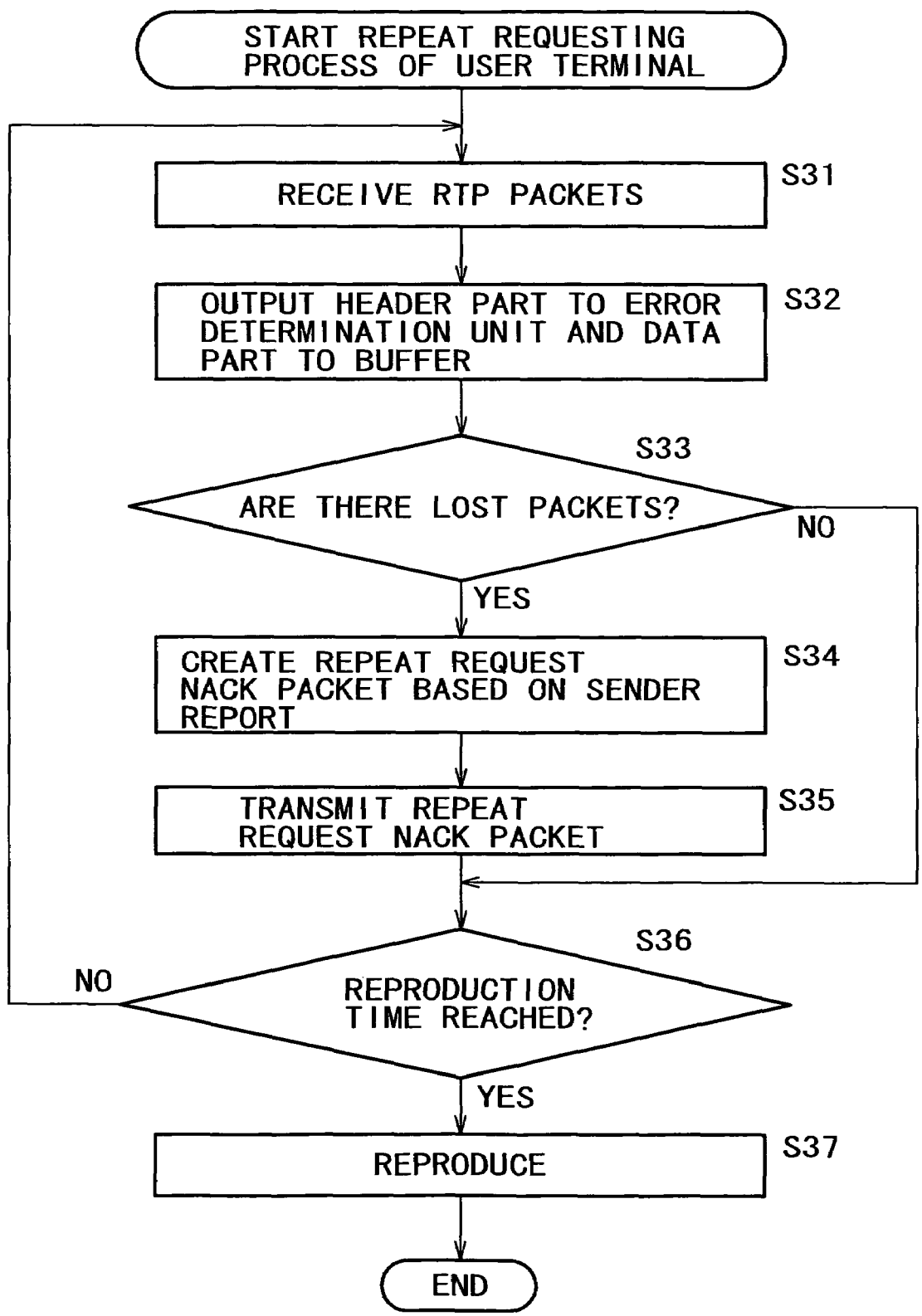
FIG. 12 is a flowchart of steps constituting a repeat requesting process performed by the user terminal in FIG. 4.

Described below with reference to the flowchart of FIG. 12 is a repeat requesting process performed by the user terminal 1 when the status of the network 2 in data transfer from the user terminal 1 to the server 3 is grasped as discussed above. In the example of FIG. 12, ARQ (Automatic Repeat Request) is assumed to be adopted as the method for error correction in data transfer between the user terminal 1 and the server 3.

Upon request from the user terminal 1, the server 3 packetizes content data under RTP and sends the packetized data to the user terminal 1 over the network 2 under RTP. In step S31, the RTP port 41 of the user terminal 1 receives the content data packetized under RTP.

In step S32, the RTC packet analysis unit 42 splits each RTP packet into a header part and a data part, analyzes the header part, stores the content data from the data part into the buffer 43, and outputs header information from the header part to the error determination unit 49.

Figure 1:
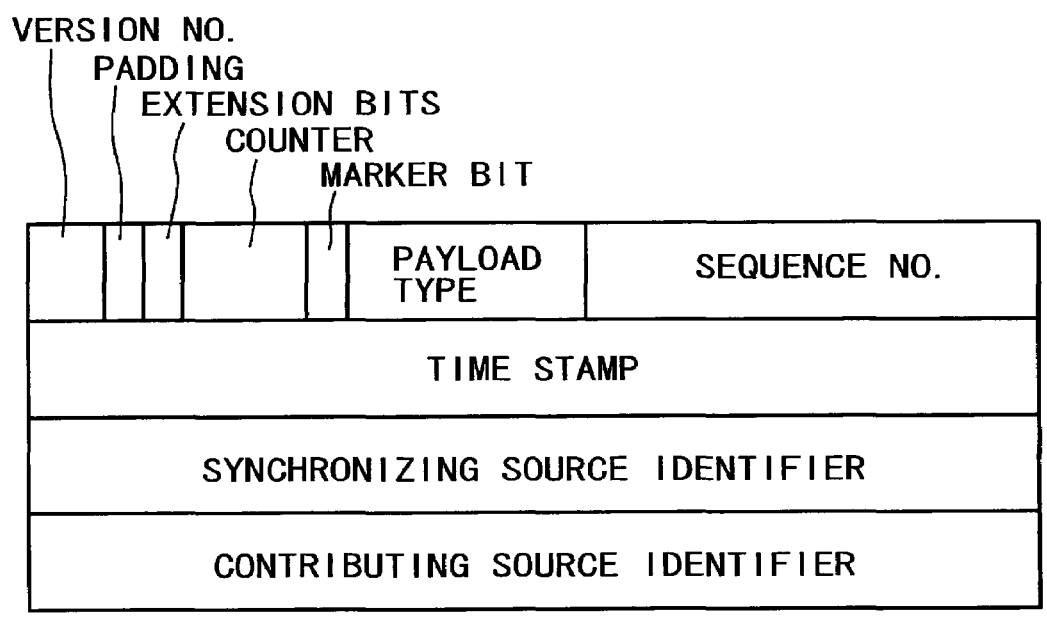
FIG. 1 is a schematic view showing a typical structure of an RTP packet.

In step S33, the error determination unit 49 determines whether any RTP packets have been lost on the basis of the header information analyzed by the RTP packet analysis unit 42. More specifically, a check is made to determine whether the sequence numbers (discussed above with reference to FIG. 1) of the RTP packets are discontinuous with the already-received sequence numbers. If a discontinuity is detected, that means there exist packets yet to be received (i.e. lost packets).

If in step S33 any RTP packets are found to have been lost, step S34 is reached. In step S34, the error determination unit 49 causes the RTCP packet creation unit 46 to create a repeat request NACK packet based on the packet loss rate in data transfer from the user terminal 1 to the server 3, the rate being found in the sender report SR analyzed by the RTCP packet analysis unit 48. In step S35, the RTCP port 47 sends the created RTCP packet of the transmission request NACK to the server 3.

The above-described steps S34 and S35 will now be described in more detail with reference to FIGS. 13 through 16.

The sender report SR created in step S8 of FIG. 11 as described above is sent from the server 3 over the network 2 at intervals of the established RTCP reference time (i.e., transmission intervals of the sender report SR), the report being supplemented with the packet loss rate E and the error RTCP sequence number list CL. The sender report SR is received by the RTCP port 47 of the user terminal 1 and analyzed by the RTCP packet analysis unit 48. The sender report SR thus analyzed allows the user terminal 1 to grasp the packet loss rate applicable to data transfer from the user terminal 1 to the server 3, i.e., the status of data transfer from the user terminal 1 to the server 3 over the network 2.

Figure 13:
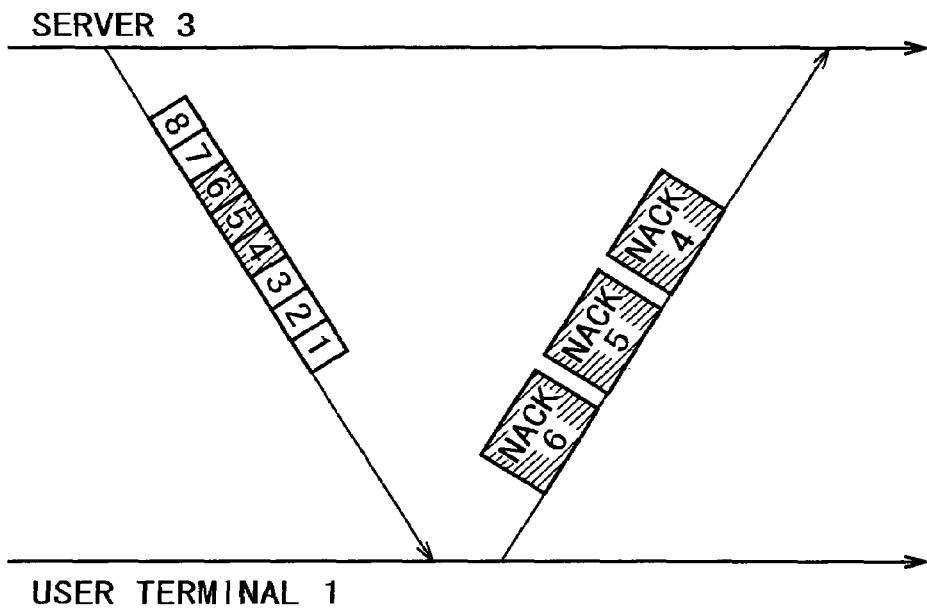
FIG. 13 is an explanatory view of NACK packets sent from the user terminal in FIG. 4.

Depending on the acquired status of data transfer from the user terminal 1 to the server 3 over the network 2, the user terminal controls repeat request as sketched in FIGS. 13 through 16. In these figures, the horizontal axis represents a time base. FIG. 13 shows that the server 3 transmits packets with RTP sequence numbers through 8 to the user terminal 1. During the transmission, the packets with sequence numbers 4 through 6 (i.e., packets shown hatched in FIG. 13) are lost; the packets with sequence numbers 1 through 3, 7 and 8 are normally received by the user terminal 1.

In turn, the user terminal 1 in FIG. 13 sends to the server 3 packets of repeat requests NACK 4 through NACK 6 (shown hatched) corresponding respectively to the lost packets with sequence numbers 4 through 6, the NACK packets being transmitted independently of one another.

Figure 14:
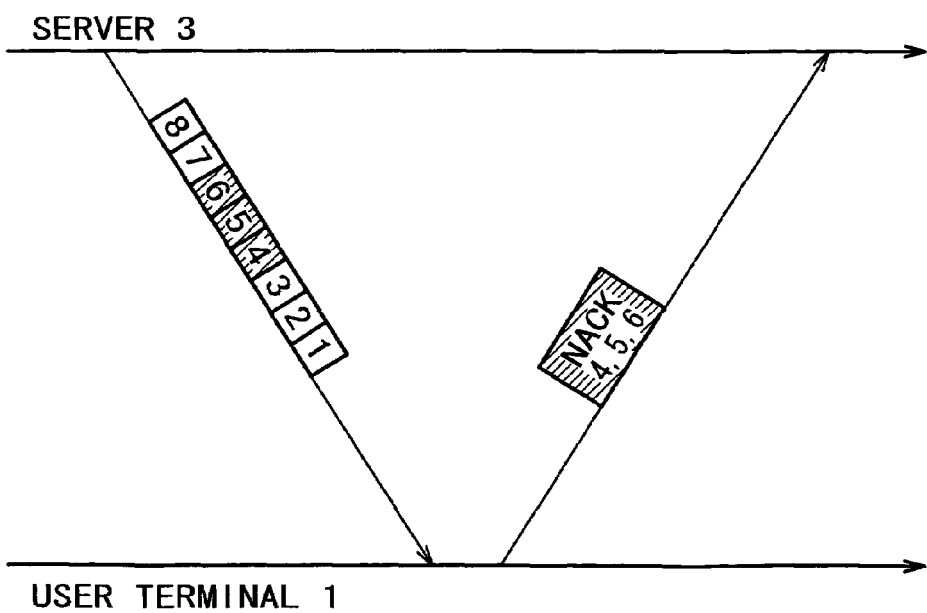
FIG. 14 is an explanatory view of another NACK packet sent from the user terminal in FIG. 4.

In the example of FIG. 14, the user terminal 1 sends to the server 3 a single packet containing repeat requests NACK 4, NACK 5 and NACK 6 corresponding to the lost packets with sequence numbers through 6 respectively.

In the example of FIG. 15, the user terminal 1 sends to the server 3 separates packets of repeat request NACK 4 through NACK 6 (shown hatched) corresponding respectively to the lost packets with sequence numbers 4 through 6, the repeat request for each lost packet being made by a plurality of NACK packets (e.g., two packets).

In the example of FIG. 16, the user terminal 1 sends to the server 3 two packets each containing repeat requests NACK 4 and NACK 5 corresponding to the lost each containing a repeat request NACK 6 corresponding to the lost packet with sequence number 6.

As described above, the error determination unit 49 may change the method for sending repeat request packets depending on the status of data transfer from the user terminal 1 to the server 3 over the network, the status being indicated by the packet loss rate which applies to data transfer in the terminal-to-server direction and which is found in the sender report SR analyzed by the RTCP packet analysis unit 48. Illustratively, if the packet loss rate is greater than the first reference value, the repeat request NACK packets are transmitted in redundant fashion as shown in FIGS. 15 and 16. The redundant transmission arrangement allows the repeat request NACK packets to reach the server 3 unfailingly.

If the packet loss rate is smaller than the second reference value (lower than the first reference value), then the number of packets to be sent is reduced as shown in FIG. 14. This transmission arrangement is aimed at reducing traffic on transmission lines. If the packet loss rate falls between the first and the second reference values, then the lost packets are retransmitted in standard fashion as depicted in FIG. 13.

If no lost packets are found in step S33, then steps S34 and S35 are skipped.

Following step S35, or with no lost packets detected in step S33, step S36 is reached. In step S36, the decoding unit 45 determines whether a reproduction time for the content data held in the buffer 43 is reached. If the current time has yet to reach the reproduction time, step S31 is reached again and the subsequent steps are repeated.

If in step S36 the current time is found to have reached the reproduction time, step S37 is reached. In step S37, the decoding unit 37 reads the content data from the buffer 43, decodes the retrieved data, and outputs the decoded data to the output unit 17.

Figure 17:
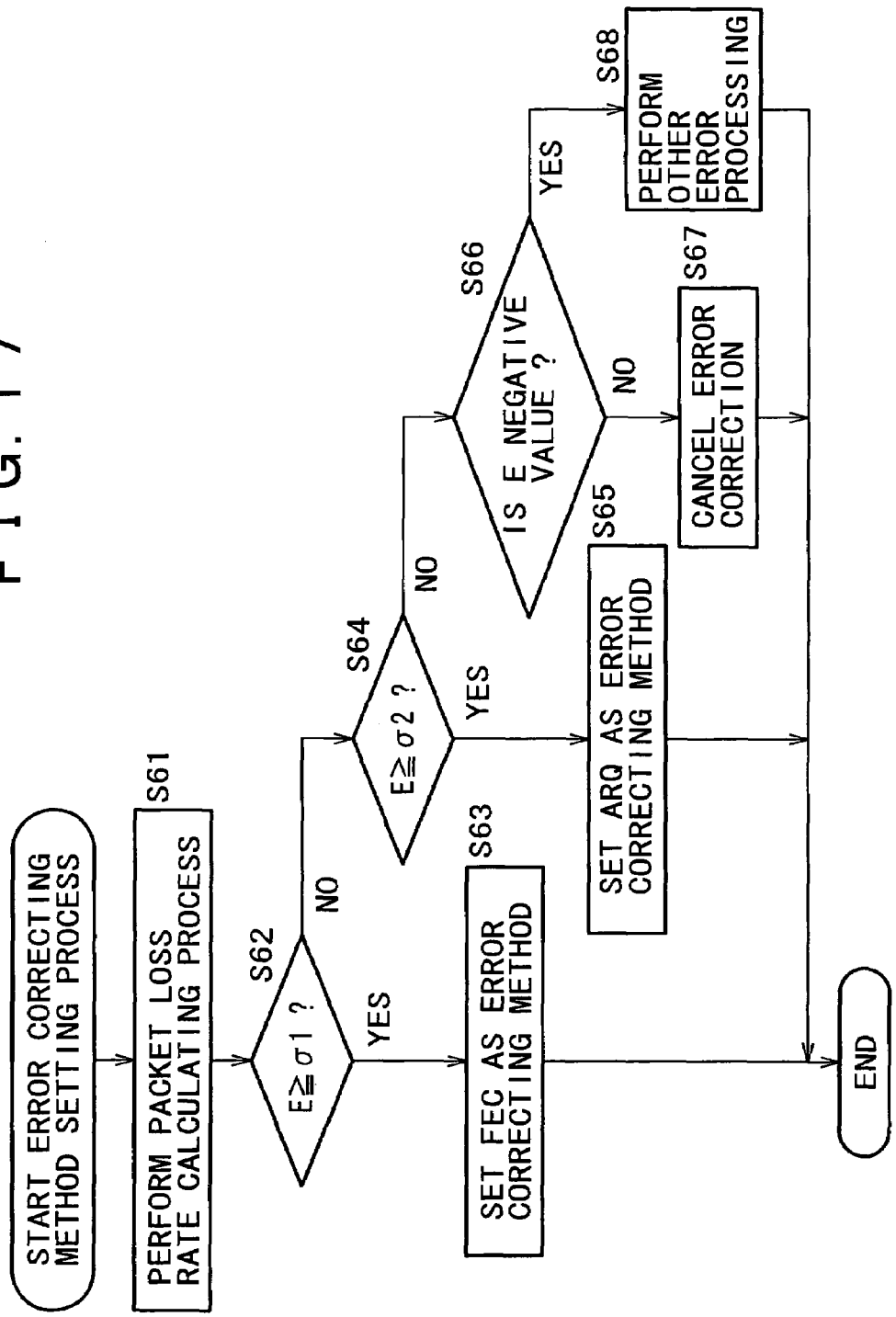
FIG. 17 is a flowchart of steps constituting an error correcting method setting process carried out by the server in FIG. 4.

Described below with reference to the flowchart of FIG. 17 is an error correcting method setting process performed by the server 3 that has grasped the status of data transfer from the user terminal 1 to the server 3 over the network 2.

In step S61, the CPU 11 of the server 3 (including the RTCP packet analysis unit 66, RTCP packet creation unit 69, and packet loss detection unit 67) carries out the process of calculating the packet loss rate E described above with reference to the flowchart of FIG. 11. The process in step S61 provides the packet loss rate E in data transfer from the user terminal 1 to the server 3. In step S62, the error processing unit 68 determines whether the packet loss rate E is equal to or greater than a predetermined reference value σ1 (0<σ1). If the packet loss rate E is found equal to or greater than the reference value σ1, then step S63 is reached. In step S63, the error processing unit 68 sets FEC (forward error correction) as the error correcting method. That is, if the packet loss rate E is equal to or greater than the reference value σ1, FEC is set as the error correcting method whereby the user terminal 1 alone determines and corrects errors without sending repeat requests to the server 3. As opposed to ARQ, FEC is used as the error correcting method to prevent data transfer between the user terminal 1 and the server 3 from becoming unduly inefficient.

If in step S62 the packet loss rate E is found smaller than the reference value σ1, then step S64 is reached. In step S64, the error processing unit 68 determines whether the packet loss rate E is equal to or greater than a reference value σ2 (0<σ2<σ1). If in step S64 the packet loss rate E is found equal to or greater than the reference value σ2 (following step S62, the packet loss rate E is smaller than the reference value σ1 and thus falls between the reference values σ2 and σ1), then step S65 is reached. In step S65, the error processing unit 68 sets ARQ as the error correcting method.

If in step S64 the packet loss rate E is found smaller than the reference value σ2, then step S66 is reached. In step S66, the error processing unit 68 determines whether the packet loss rate is a negative value. If in step S66 the packet loss rate E is not found to be a negative value, then step S67 is reached. In step S67, the error processing unit 68 cancels error control and lets off error correction.

If in step S66 the packet loss rate E is found to be a negative value, then step S68 is reached. In step S68, the error processing unit 68 carries out some other kind of error processing. More specifically, where the packet loss rate E takes on an inconceivable value (negative value in this case), that can mean malfunction of the user terminal 1 or server 3. In such a case, other appropriate error processing measures need to be taken.

As described, the server is allowed to change the method for correcting errors depending on the status in data transfer from the user terminal 1 to the server 3 over the network 2, the status being represented by the packet loss rate in data transfer in the terminal-to-server direction. This permits efficient data transmissions between the user terminal 1 and the server 3.

As described above, the RTCP sequence number added to each RTCP packet in RTP-based transmissions makes it possible to know the packet loss rate in data transfer from the user terminal 1 to the server 3. The packet loss rate thus obtained is added to the sender report under RTCP, allowing both the user terminal 1 and the server 3 to grasp the packet loss rate in data transfer from the user terminal 1 to the server 3.

When using ARQ (Automatic Repeat Request) in RTP-based transmissions, the user terminal 1 can dynamically choose the manner in which to send repeat requests to the server 3 in keeping with the packet loss rate in data transfer from the user terminal 1 to the server 3. That is, the requests to transmit lost packets are sent in overlapping or redundant fashion so that the retransmissions can be requested more accurately and more efficiently than before. Furthermore, the server 3 may switch the error correcting method from ARQ to FEC depending on the packet loss rate in data transmission from the user terminal 1 to the server 3. If the packet loss rate during data transfer is very low, the server 3 may dispense with error correction altogether.

That is, not only the packet loss rate from the server 3 to the user terminal 1 is obtained, but also the packet loss rate from the user terminal 1 to the server 3 is acquired. The packet loss rates thus gained are grasped by both the server 3 and the user terminal 1. This makes it possible to bring about data transmissions in a more flexible and more reliable manner with greater resistance to errors than before. These features allow the user at the user terminal 1 to acquire data in more satisfactory fashion than ever.

The series of steps or processes described above may be executed either by hardware or by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

As shown in FIG. 5, the program storage medium carrying the programs to be installed into the computer for execution may be a package medium constituted by the magnetic disk (including flexible disks) 21, optical disk (including CD-ROM (compact disc-read only memory) and DVD (digital versatile disc)) 22, magneto-optical disk (including MD (Mini-disc), a registered trademark) 23, or semiconductor memory 24; or may be offered in the form of the ROM 12 or the storage unit 18 in which the programs are held temporarily or permanently.

In this description, the steps which are stored on the program storage medium and which describe the programs to be executed represent not only the processes that are to be carried out in the depicted sequence (i.e., on a time series basis) but also processes that may be performed parallelly or individually.

In this description, the term "system" refers to an entire configuration made up of a plurality of component devices.

INDUSTRIAL APPLICABILITY

As described, a system capable of allowing the two-way network status to be grasped by the communicating parties involved is implemented according to the invention. The inventive system enables repeat requests to be made in more accurate and more efficient fashion. In addition, the system of the invention offers the choice of an optimally efficient error correcting method depending on the network status currently.

The invention claimed is:

1. An information processing system comprising a server for transmitting data packets over a network using a protocol for packetized data transmission and a receiver for receiving the data packets;

wherein the server:
      receives a report from the receiver;
      acquires a sequence number from the receiver report;
      calculates a loss rate of packets transmitted from the receiver to the server based on the sequence number;
      sets an error correction method based on the packet loss rate, wherein:
         if the packet loss rate is greater than a first reference value, the server sets forward error correction (FEC), whereby the receiver corrects transmission errors, as the method for correcting transmission errors, and
         if the packet loss rate is less than the first reference value and greater than a second reference value, the server sets automatic repeat request (ARQ), whereby the receiver requests the server to transmit lost data packets, as the method for correcting transmission errors;
      includes the packet loss rate in a sender report; and
      transmits the sender report to the receiver; and
   wherein the receiver:
      receives the data packets from the server,
      acquires information identifying lost data packets from the data packets, and
      transmits to the server a request to transmit the lost data packets, a method of transmitting the request being based upon the packet loss rate in the sender report.

2. A method for transmitting data packets from a server to a receiver over a network using a protocol for packetized data transmission, the method comprising:

by the server:
      receiving a report from the receiver;
      acquiring a sequence number from the receiver report;
      calculating a loss rate of packets transmitted from the receiver to the server based on the sequence number;
      setting a transmission error correction method based on the packet loss rate, wherein:
         if the packet loss rate is greater than a first reference value, the server sets forward error correction (FEC), whereby the receiver corrects transmission errors, as the transmission error correction method, and if the packet loss rate is less than the first reference value and greater than a second reference value, the server sets automatic repeat request (ARQ), whereby the receiver requests the server to transmit lost data packets, as the transmission error correction method;

including the packet loss rate in a sender report, and transmitting the sender report to the receiver; and by the receiver:
receiving the data packets from the server,
acquiring information identifying lost data packets from the data packets, and
transmitting to the server a request to transmit the lost data packets, a method of transmitting the request being based upon the packet loss rate in the sender report.

3. A server for transmitting data packets to a receiver over a network using a protocol for packetized data transmission, the server comprising:

means for acquiring a sequence number from a report transmitted from the receiver to the server;

means for calculating a loss rate of packets transmitted from the receiver to the server based on the sequence number;

means for setting a transmission error correction method based on the packet loss rate, wherein:

if the packet loss rate is greater than a first reference value, the server sets forward error correction (FEC), whereby the receiver corrects transmission errors, as the transmission error correction method, and if the packet loss rate is less than the first reference value and greater than a second reference value, the server sets automatic repeat request (ARQ), whereby the receiver requests the server to transmit lost data packets, as the transmission error correction method;

means for transmitting a sender report containing the packet loss rate to the receiver; and means for transmitting lost data packets in response to a request from the receiver, a format of the request being based upon the packet loss rate contained in the sender report.

4. The server according to claim 3, wherein the protocol is a combination of real-time transport protocol (RTP) and real time control protocol (RTCP).

5. A method of a server for transmitting data packets to a receiver over a network using a protocol for packetized data transmission, the method comprising:

acquiring a sequence number from a report transmitted from the receiver;

calculating a loss rate of packets transmitted from the receiver to the server based on the sequence number;

setting a transmission error correction method based on the packet loss rate, wherein:

if the packet loss rate is greater than a first reference value, the server sets forward error correction (FEC), whereby the receiver corrects transmission errors, as the transmission error correction method, and if the packet loss rate is less than the first reference value and greater than a second reference value, the server sets automatic repeat request (ARQ), whereby the receiver requests the server to transmit lost data packets, as the transmission error correction method;

transmitting a sender report containing the packet loss rate to the receiver; and transmitting lost data packets in response to a request from the receiver, a format of the request being based upon the packet loss rate contained in the sender report.

6. A computer-readable storage medium storing a computer program which, when executed by a server, causes the server to perform a method for transmitting data packets to a receiver over a network using a protocol for packetized data transmission, the method comprising:

acquiring a sequence number from a report transmitted from the receiver;

calculating a loss rate of packets transmitted from the receiver to the server based on the sequence number;

setting a transmission error correction method based on the packet loss rate, wherein:

if the packet loss rate is greater than a first reference value, the server sets forward error correction (FEC), whereby the receiver corrects transmission errors, as the transmission error correction method, and if the packet loss rate is less than the first reference value and greater than a second reference value, the server sets automatic repeat request (ARQ), whereby the receiver requests the server to transmit lost data packets, as the transmission error correction method;

transmitting a sender report containing the packet loss rate to the receiver; and transmitting lost data packets in response to a request from the receiver, a format of the request being based upon the packet loss rate contained in the sender report.

7. A receiver for receiving data packets from a server over a network using a protocol for packetized data transmission, the receiver comprising:

means for receiving the data packets from the server;

means for acquiring information about lost data packets from the received data packets;

means for transmitting a request to the server to transmit the lost data packets, a method of transmitting the request being based upon a loss rate of packets transmitted from the receiver to the server contained in a sender report received from the server, the means for transmitting including:

means for, if the packet loss rate falls within a first range, transmitting to the server multiple request packets each identifying the same lost data packet;

means for, if the packet loss rate falls within a second range, transmitting to the server a request packet identifying multiple lost data packets; and means for, if the packet loss rate falls within a third range, transmitting to the server multiple request packets each identifying a different lost data packet;

means for communicating in accordance with a transmission error correction method set by the server, wherein:

if the packet loss rate is greater than a first reference value, forward error correction (FEC), whereby the receiver corrects transmission errors, is set as the transmission error correction method; and if the packet loss rate is less than the first reference value and greater than a second reference value, automatic repeat request (ARQ), whereby the receiver requests the server to transmit lost data packets, is set as the transmission error correction method.

8. The receiver according to claim 7, wherein the protocol for packetized data transmission is a combination of real-time transport protocol (RTP) and real time control protocol (RTCP).

9. The receiver according to claim 7, wherein, if automatic repeat request (ARQ) is used for correcting transmission errors in the data packets and if the packet loss rate is greater than a reference value, the means for generating generates the request in a redundant manner.

10. A method of a receiver for receiving data packets from a server over a network using a protocol for packetized data transmission, the method comprising:

receiving the data packets from the server;

acquiring information about lost data packets from the received data packets;

transmitting a request to the server to transmit the lost data packets, a method of transmitting the request being based upon a loss rate of packets transmitted to the server contained in a sender report received from the server and including:

if the packet loss rate falls within a first range, transmitting to the server multiple request packets each identifying the same lost data packet;

if the packet loss rate falls within a second range, transmitting to the server a request packet identifying multiple lost data packets; and if the packet loss rate falls within a third range, transmitting to the server multiple request packets each identifying a different lost data packet; and communicating in accordance with a transmission error correction method set by the server, wherein:

if the packet loss rate is greater than a first reference value, forward error correction (FEC), whereby the receiver corrects transmission errors, is set as the transmission error correction method; and if the packet loss rate is less than the first reference value and greater than a second reference value, automatic repeat request (ARQ), whereby the receiver requests the server to transmit lost data packets, is set as the transmission error correction method.

11. A computer-readable storage medium storing a computer program which, when executed by a receiver, causes the receiver to perform a method for receiving data packets from a server over a network using a protocol for packetized data transmission, the method comprising:

receiving the data packets from the server;

acquiring information about lost data packets from the received data packets;

transmitting to the server a request to transmit the lost data packets, a method of transmitting the request being based upon a loss rate of packets transmitted to the server contained in a sender report received from the server and including:

if the packet loss rate falls within a first range, transmitting to the server multiple request packets each identifying the same lost data packet;

if the packet loss rate falls within a second range, transmitting to the server a request packet identifying multiple lost data packets; and if the packet loss rate falls within a third range, transmitting to the server multiple request packets each identifying a different lost data packet; and communicating in accordance with a transmission error correction method set by the server, wherein:

if the packet loss rate is greater than a first reference value, forward error correction (FEC), whereby the receiver corrects transmission errors, is set as the transmission error correction method; and if the packet loss rate is less than the first reference value and greater than a second reference value, automatic repeat request (ARQ), whereby the receiver requests the server to transmit lost data packets, is set as the transmission error correction method.

\* \* \* \* \*